US008449425B2

(12) United States Patent
Hashimoto

(10) Patent No.: US 8,449,425 B2
(45) Date of Patent: May 28, 2013

(54) ELECTRIC TOOL

(75) Inventor: Ryu Hashimoto, Anjo (JP)

(73) Assignee: Makita Corporation, Anjo-Shi (JP)

( * ) Notice: Subject to any disclaimer, the term of this patent is extended or adjusted under 35 U.S.C. 154(b) by 15 days.

(21) Appl. No.: 13/263,150

(22) PCT Filed: Mar. 31, 2010

(86) PCT No.: PCT/JP2010/055825
§ 371 (c)(1),
(2), (4) Date: Oct. 26, 2011

(87) PCT Pub. No.: WO2010/119768
PCT Pub. Date: Oct. 21, 2010

(65) Prior Publication Data

US 2012/0040793 A1 Feb. 16, 2012

(30) Foreign Application Priority Data

Apr. 13, 2009 (JP) ................................. 2009-097201

(51) Int. Cl.
*F16H 48/06* (2006.01)
*F16H 3/44* (2006.01)

(52) U.S. Cl.
USPC ............................ 475/153; 475/299; 475/317

(58) Field of Classification Search
USPC .................................. 475/153, 270, 299, 317
See application file for complete search history.

(56) References Cited

U.S. PATENT DOCUMENTS 4,908,926 A 3/1990 Takeshima et al.
5,385,512 A * 1/1995 Moolenaar et al. ........... 475/153
5,711,739 A 1/1998 Hashimoto et al.
5,967,934 A 10/1999 Ishida et al.
6,102,632 A 8/2000 Potter et al.
6,984,188 B2 * 1/2006 Potter et al. ................... 475/298
8,142,326 B2 * 3/2012 Chen ............................. 475/299

FOREIGN PATENT DOCUMENTS

JP A-1-171777 7/1989
JP A-8-68446 3/1996
JP A-9-72393 3/1997
JP A-11-320224 11/1999
JP B2-3084138 9/2000
JP B2-3289958 6/2002

* cited by examiner

*Primary Examiner* — Edwin A Young
(74) *Attorney, Agent, or Firm* — Oliff & Berridge, PLC

(57) ABSTRACT

One aspect of the invention includes a speed changing device which can be switched from a high-speed low-torque output state to a low-speed high-torque output state. In the high-speed low-torque state, a second stage internal gear rotates together with a first stage carrier. The low-speed high-torque output state is caused as the second stage internal gear is disconnected from the first stage carrier so as to be restricted from rotating. The timing of resetting the speed changing device is shifted relative to the timing of stopping the electric motor by an OFF operation of the switch lever with a delay mechanism, so that the second stage internal gear is engaged with the first stage carrier after the rotation through inertia is stopped, whereby its impact is reduced.

3 Claims, 15 Drawing Sheets

ELECTRIC TOOL

TECHNICAL FIELD

The present invention relates to an electric tool, such as an electric screwdriver, a screw tightening device, etc., configured to output mainly a rotational power.

BACKGROUND ART

In general, the electric tool of this type has a configuration to reduce the rotational power of an electric motor as a drive source by a speed changing device and output a required rotational torque. In many cases, a planetary gear mechanism is used as the speed changing device.

For example, in the screw tightening device, a small torque is sufficient in the initial stage of tightening operation, and the required rotational torque increases gradually in association with proceeding of the tightening operation. Therefore, lowering of the reducing ratio of the speed changing device and producing an output of a high-speed low-torque in the initial stage of the tightening operation, and increasing the reducing ratio of the speed changing device achieving a production of an output of a low-speed high-torque in a halfway stage of the tightening operation is a function required in view of achieving a quick and reliable screw tightening operation. In addition, switching of the reducing ratio automatically at a time point when a tightening resistance (load torque) to be applied to a spindle (output shaft) via a screw tightening bit reaches a certain value in a halfway stage of the tightening operation is required in terms of usability.

Japanese Patent No. 3289958 discloses a screw tightening device having a speed changing device including two-stage planetary gear mechanism interposed between an output shaft of an electric motor and a spindle on which a screw tightening bit is mounted. According to this speed changing device, a carrier of a first stage planet and a carrier of a second stage planet are directly connected by achieving a state in which an internal gear of the second stage planetary gear mechanism (second stage planet) on the output side and the carrier of the first stage planetary gear mechanism (first stage planet) are integrated in terms of rotation in the initial stage of tightening and, consequently, an output of a high-speed low-torque is produced and quick screw tightening is achieved. When the screw tightening operation is proceeded and a user increases a pressing force of the screw tightening device, the internal gear of the second stage planet is relatively displaced in the axial direction, and is disconnected from the carrier of a first stage planet in terms of rotation and fixed, so that the speed reduction at the second stage planet becomes effective and hence is applied to the speed reduction at the first stage planet and, consequently, the reducing ratio of the speed changing device is increased and hence an output of a low-speed high-torque is produced, so that reliable screw tightening is achieved.

Also, according to another prior art, the low-speed high-torque output state is locked by holding an internal gear of a second stage planet at a position disconnected from a carrier of a first stage planet. In this case, by releasing the lock state of the internal gear and returning the same to the initial position integrated with the carrier of the first stage planet in terms of rotation using a reset mechanism, the speed changing device is reset to a high-speed low-torque output state (initial state).

Japanese Patent No. 3084138 discloses a reset mechanism configured to return the low-speed high-torque output state switched by the automatic speed change to the high-speed low-torque output state in the initial state. According to the reset mechanism of this prior art, since it is configured such that the speed changing device is returned to the initial state (high-speed low-torque output state) using a switch lever returning operation (OFF operation) performed for stopping the operation of a main body portion, the speed changing device can be reset to the initial state without need of a specific operation of the screw tightening device by a user.

However there have been the following problems in these reset mechanisms of the prior art. The reset mechanisms of the prior art are configured such that when an OFF operation of the switch lever is performed, the internal gear of the second stage planet is returned instantaneously to the initial position substantially simultaneously therewith. In contrast, immediately after blockage of a power source by the OFF operation of the switch lever, the electric motor rotates through inertia until the motor is completely stopped, and hence the carrier of the first stage planet gets into a state of being rotated through inertia although short time. Therefore, when the reset mechanism is operated by the OFF operation of the switch lever, the internal gear of the second stage planet which has been in the rotation restricted state with respect to the carrier of the first stage planet rotating through inertia is engaged in terms of rotation, and the impact produced at the time of engagement may impair the durability of the speed changing device.

Therefore, there has been a need in the art to improve the durability of a speed changing device by reducing an impact produced at the time of reset in a reset mechanism configured to reset a speed changing device to an initial state by using an OFF operation of a switch lever.

SUMMARY OF THE INVENTION

In one aspect of the present invention when an ON operation of a switch lever is performed, an electric motor is activated, so that the electric tool can be operated. If an external torque applied to the spindle is increased during the operation of the electric tool, an internal gear of a second stage planetary gear mechanism is displaced to a rotation-restricted position and hence the rotation thereof is restricted and, consequently, the speed changing device is automatically switched to a low-speed high-torque output state. As the internal gear of the second stage planetary gear mechanism rotates together with a carrier of a first stage planetary gear mechanism, a reduction ratio of the speed changing device is decreased to a high-speed low-torque output state, and as the internal gear of the second stage planetary gear mechanism is disconnected from the carrier of the first stage planetary gear mechanism to restrict the rotation thereof, the reduction ratio of the speed changing device is increased to the low-speed high-torque output state.

The low-speed high-torque output state is locked by a speed change lock mechanism, and this lock state is released by a resetting mechanism activated by an OFF operation of the switch lever, so that the speed changing device is reset to the initial state.

A shift in terms of time between timing of stopping the electric motor achieved by the OFF operation of the switch lever and timing of releasing the speed change lock mechanism achieved by the resetting mechanism is produced by a delaying mechanism. Therefore, after the OFF operation of the switch lever, the speed change lock mechanism is released after the termination of rotation of the electric motor through inertia or immediately before the termination, so that the internal gear of the second stage planetary gear mechanism is returned to the rotation-allowed position for engaging with the carrier of the first stage planetary gear mechanism.

In this manner, when the OFF operation of the switch lever is performed after the operation in the low-speed high-torque output state is terminated, the speed change lock mechanism is released after a given period from stopping of the electric motor, whereby the speed changing device is reset to the initial state. Therefore, the internal gear of the second stage planetary gear mechanism is returned to the rotation-allowed position for engaging with the carrier of the first stage planetary gear mechanism when the rotation of the motor through inertia after stopping of the motor is terminated or immediately before the termination, so that an impact produced at the time of engagement can be reduced significantly than in the prior art, and it is possible to improve the durability of the speed changing device.

In contrast, the prior art is configured such that the internal gear of the second stage planetary gear mechanism restricted from rotating is engaged with the carrier of the first stage planetary gear mechanism in a stage in which the carrier of the first stage planetary gear mechanism rotates through inertia immediately after or at the same time of termination of the electric motor, and therefore, an impact produced at the time of engagement is significant and hence durability of the speed changing device is impaired.

In another aspect of the present invention, as an external torque applied to a spindle is increased, an internal gear of the second stage planetary gear mechanism is disconnected from the carrier of the first stage planetary gear mechanism and is displaced to the rotation-restricted position, and hence the speed changing device is automatically switched to the low-speed high-torque output state. The low-speed high-torque output state is locked as a lock ring is displaced to a lock position and an engaging ball engages with the second stage internal gear. A rotational torque is applied to the internal gear of the second stage planetary gear mechanism restricted from rotating via a planetary gear. The engaging ball is displaced by the rotational torque in the direction intersecting the direction of displacement of the lock ring. A holding hole is formed, for example, into an elongated groove hole elongated about a tool axis so as to allow the displacement of the engaging ball. As the engaging ball is displaced in the direction intersecting the direction of displacement of the lock ring, the engaging ball is prevented from entering a relief recess, so that the internal gear is held in a state of being locked to the rotation-restricted position by the engaging ball. Therefore, when the speed changing device is in a stage of being reset to the initial state by the resetting mechanism, in order to cause the engaging ball to be accommodated in the relief recess of the lock ring and cause the internal gear of the second stage planetary gear mechanism to be displaced from the rotation-restricted position to the rotation-allowed position and be engaged with the carrier of the first stage planetary gear mechanism, the engaging ball is required to be displaced in the holding groove in the direction intersecting the direction of displacement of the lock ring, and therefore, the lock ring is returned to the unlock position after a time period required for the displacement and the internal gear of the second stage planetary gear mechanism is returned to the rotation-allowed position.

Accordingly, after the OFF-operation of the switch lever has been performed, the internal gear of the second planetary gear mechanism is engaged with the carrier of the first stage planetary gear mechanism to be reset to the initial state when the rotation of the electric motor through inertia is terminated or immediately before the termination, and therefore, an impact produced at the time point when the internal gear of the second stage planetary gear mechanism engages with the carrier of the first stage planetary gear mechanism can be significantly reduced and hence durability of the speed changing device is improved.

In a further aspect of the present invention, after the electric motor has stopped by the OFF operation of the switch lever, the lock ring is returned to the unlock position after a period of time corresponding to the idling time of the switch lever relative to the reset arm, and the internal gear of the second stage planetary gear mechanism is returned from the rotation-restricted position to the rotation-allowed position, whereby the internal gear of the second stage planetary gear mechanism is engaged with the carrier of the first stage planetary gear mechanism and hence the speed changing device is reset to the initial state.

Accordingly, also with this arrangement, after the OFF-operation of the switch lever has been performed, the internal gear of the second stage planetary gear mechanism is engaged with the carrier of the first stage planetary gear mechanism to be reset to the initial state when the rotation of the electric motor through inertia is terminated or immediately before termination, and therefore, an impact produced at the time point when the internal gear engages with the carrier can be significantly reduced in comparison with the prior art and hence durability of the speed changing device is improved.

DETAILED DESCRIPTION OF THE INVENTION

Figure 1:
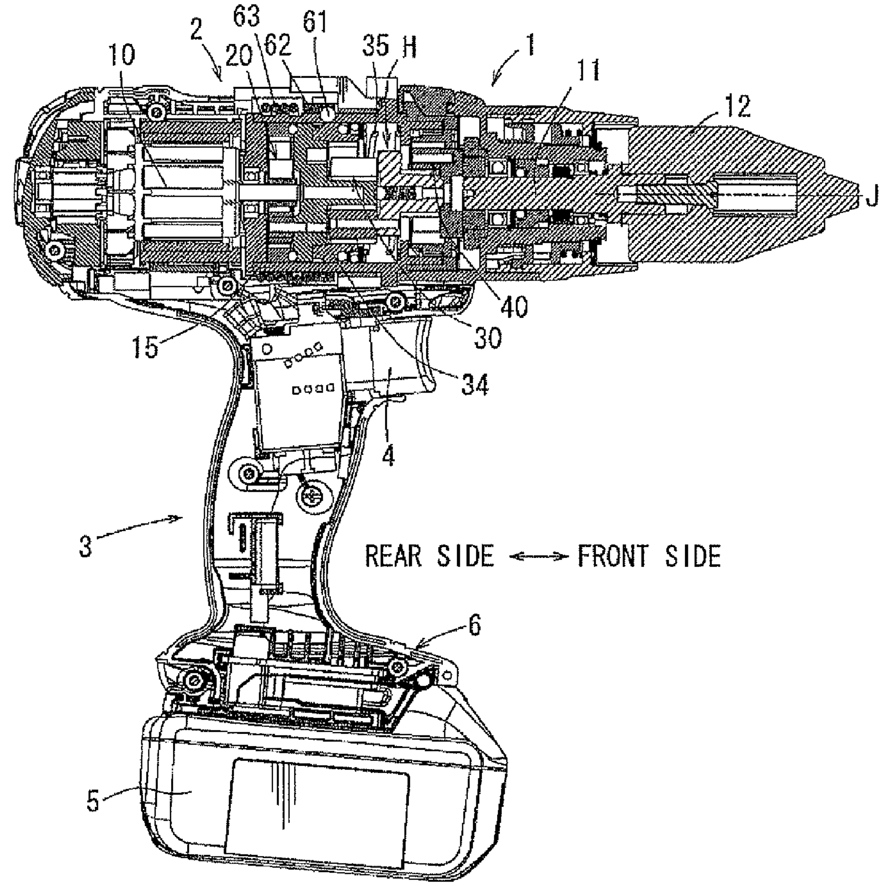
FIG. 1 is a vertical cross-sectional view of an entire electric tool according to a present embodiment. This figure shows an initial state of a speed changing device.

Referring now to FIG. 1 to FIG. 23, an embodiment of the present invention will be described. FIG. 1 shows an entire electric tool 1 according to the present embodiment. In this embodiment, a rechargeable electric screw driver drill is exemplified as an example of the electric tool 1. This electric tool 1 can be used as an electric screw tightening device by mounting a driver bit as an end tool, and can be used as an electric drill for a boring process by mounting a drill bit.

The electric tool 1 includes a main body portion 2 and a handle portion 3. The main body portion 2 has a substantially cylindrical shape, and the handle portion 3 is provided in a state of projecting sideward from an intermediate position thereof with respect to the longitudinal direction (a tool axis direction).

A trigger-type switch lever 4 is arranged on the front side of the base portion of the handle portion 3. When a user pulls (ON operation) the switch lever 4 with his or her finger, an electric motor 10 installed in a rear portion of the main body portion 2 is activated. Also, provided at a front end of the handle portion 3 is a battery mounting seat portion 6 for mounting a battery pack 5. The electric motor 10 is operated by using the battery pack 5 as a power source.

The rotational power of the electric motor 10 is reduced by a speed changing device H having three planetary gear mechanisms and is thereafter outputted to a spindle 11. A chuck 12 for mounting an end tool is attached to a front end of the spindle 11.

Figure 2:
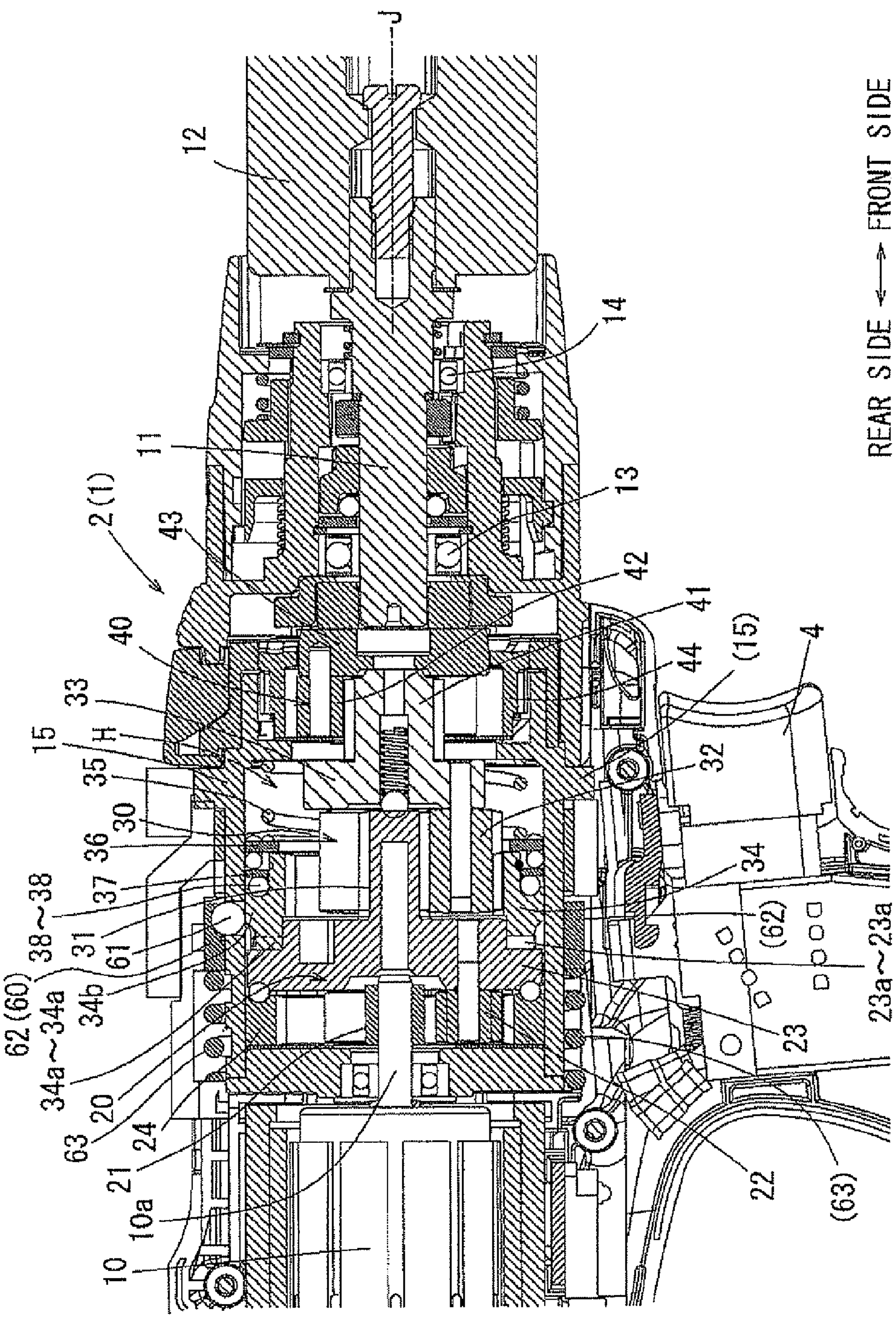
FIG. 2 is an enlarged view of the speed changing device according to the present embodiment. This figure shows an initial state of the speed changing device, which is a high-speed low-torque output state.
Figure 3:
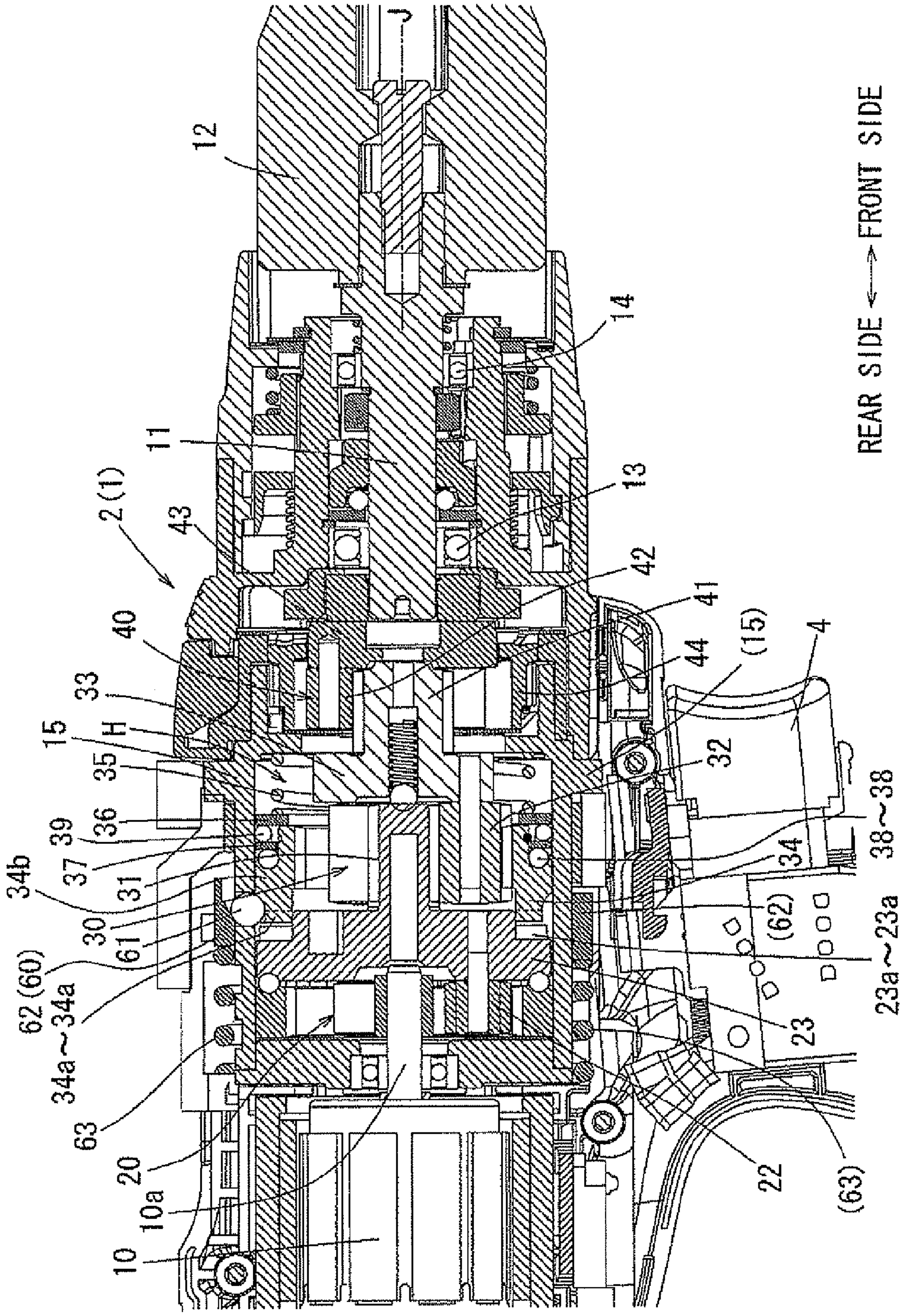
FIG. 3 is an enlarged view of the speed changing device according to the present embodiment. This figure shows a state in which the speed changing device has been switched to a low-speed high-torque output state.

The three planetary gear mechanisms are interposed in a power transmitting path extending from the electric motor 10 to the spindle 11. Hereinafter, they are referred to as a first stage planet 20, a second stage planet 30, and a third stage planet 40 from the upstream side (the side of the electric motor 10) of the power transmitting path. The first to third stage planets 20, 30, 40 are shown in FIG. 2 and FIG. 3 in detail. The first to third stage planets 20, 30, 40 are assembled in a cylindrical gear housing 15 fixed to the main body portion 2, are arranged coaxially with an output shaft **10*a* of the electric motor 10, and are arranged also coaxially with the spindle 11. Hereinafter, the rotational axis of the spindle 11 (the rotational axis of the output shaft 10***a* of the electric motor 10) will be also referred to as a tool axis J. The electric motor 10, the first to third stage planets 20, 30, 40, and the spindle 11 are arranged on the tool axis J. The direction along the tool axis J is a direction of the tool axis of the electric tool 1, and the tool axis direction corresponds to the longitudinal direction of the main body portion 2.

A first stage sun gear 21 of the first stage planet 20 is mounted on the output shaft 10*a* of the electric motor 10. Three first stage planetary gears 22-22 are engaged with the first stage sun gear 21. These three first stage planetary gears 22-22 are rotatably supported by a first stage carrier 23. These three first stage planetary gears 22-22 are engaged with a first stage internal gear 24. The first stage internal gear 24 is mounted along the inner surface of the gear housing 15. The first stage internal gear 24 is fixed so as not to rotate about the tool axis J and not to move in the direction of the tool axis J.

A second stage sun gear 31 of the second stage planet 30 is integrally provided at a center of a front surface of the first stage carrier 23. Three second stage planetary gears 32-32 are engaged with the second stage sun gear 31. These three second stage planetary gears 32-32 are rotatably supported by a second stage carrier 33. In addition, these three second stage planetary gears 32-32 are engaged with the second stage internal gear 34. The second stage internal gear 34 is supported along the inner surface of the gear housing 15 in a state of being rotatable about the tool axis J and being displaceable within a certain range in the direction of the tool axis J. Detailed description of the second stage internal gear 34 will be given later.

A third stage sun gear 41 of the third stage planetary gear mechanism 40 is integrally provided at a center of a front surface of the second stage carrier 33. Three third stage planetary gears 42-42 are engaged with the third stage sun gear 41. These three third stage planetary gears 42-42 are rotatably supported by a third stage carrier 43. These three third stage planetary gears 42-42 are engaged with a third stage internal gear 44. The third stage internal gear 44 is mounted along the inner surface of the gear housing 15. The third stage internal gear 44 is fixed so as not to be rotate about the tool axis J and not to move in the direction of the tool axis J.

The spindle 11 is coaxially coupled to a center of a front surface of the third stage carrier 43. The spindle 11 is rotatably supported about the tool axis J via bearings 13, 14. The chuck 12 is mounted to the front end of the spindle.

[Automatic Speed Changing Device H]

As described above, the second stage internal gear 34 is supported so as to be rotatable about the tool axis J and to be movable within a certain range in the direction of the tool axis J. Provided on a rear surface of the second stage internal gear 34 are a plurality of clutch teeth 34*a*-34*a* along the circumferential direction. These clutch teeth 34*a*-34*a* are engaged with clutch teeth 23*a*-23*a* provided on a front surface of the first stage carrier 23 also along the circumferential direction. FIG. 2 shows a state in which the clutch teeth 34*a*-34*a* of the second stage internal gear 34 engage the clutch teeth 23*a*-23*a* of the first stage carrier 23. In this state of engagement, the second stage internal gear 34 is positioned at a rotation-allowed position on the rear side (the left side in FIG. 2) in the direction of the tool axis J and, in this rotation-allowed position, the second stage internal gear 34 rotates with the first stage carrier 23. Therefore, in this case, the second stage sun gear 31 and the second stage internal gear 34 rotate together.

When the external torque of a certain extent or more is applied to the second stage internal gear 34 via the spindle 11, the second stage internal gear 34 rotates relative to the first stage carrier 23 and hence engagement between the clutch teeth 34*a* and the clutch teeth 23*a* is released and, consequently, the second stage internal gear 34 is displaced forward with respect to the direction of the tool axis J (rightward in FIG. 2).

The second stage internal gear 34 is urged toward the above-described rotation-allowed position by a compression spring 35. Therefore, the second stage internal gear 34 is displaced forwardly with respect to the direction of the tool axis J (in the direction in which the clutch teeth 23*a*, 34*a* are released) against an urging force of the compression spring 35. A given external torque for causing the second stage internal gear 34 to be displaced forward for switching the reducing ratio is set on the basis of the urging force of the compression spring 35.

The compression spring 35 acts on a front surface of the second stage internal gear 34 with the intervention of a pressing plate 36. In other words, the second stage internal gear 34 is pressed in a direction in which the clutch teeth 34*a*, 23*a* engage with each other by the urging force of the compression spring 35 which acts thereon via the annular pressing plate 36 in abutment with the front surface thereof, that is, toward the rotation-allowed position.

A rolling plate 37 is arranged on the rear side of the pressing plate 36. The rolling plate 37 also has an annular shape, and is supported so as to be rotatable about the tool axis J along the circumference of the second stage internal gear 34. A number of steel balls 38-38 are held between the rolling plate 37 and a front surface of a flange portion 34*b* provided on a peripheral surface of the second stage internal gear 34. The steel balls 38-38 and the rolling plate 37 serve as a thrust bearing that causes the urging force of the compression spring 35 to act while rotatably supporting the second stage internal gear 34.

Figure 4:
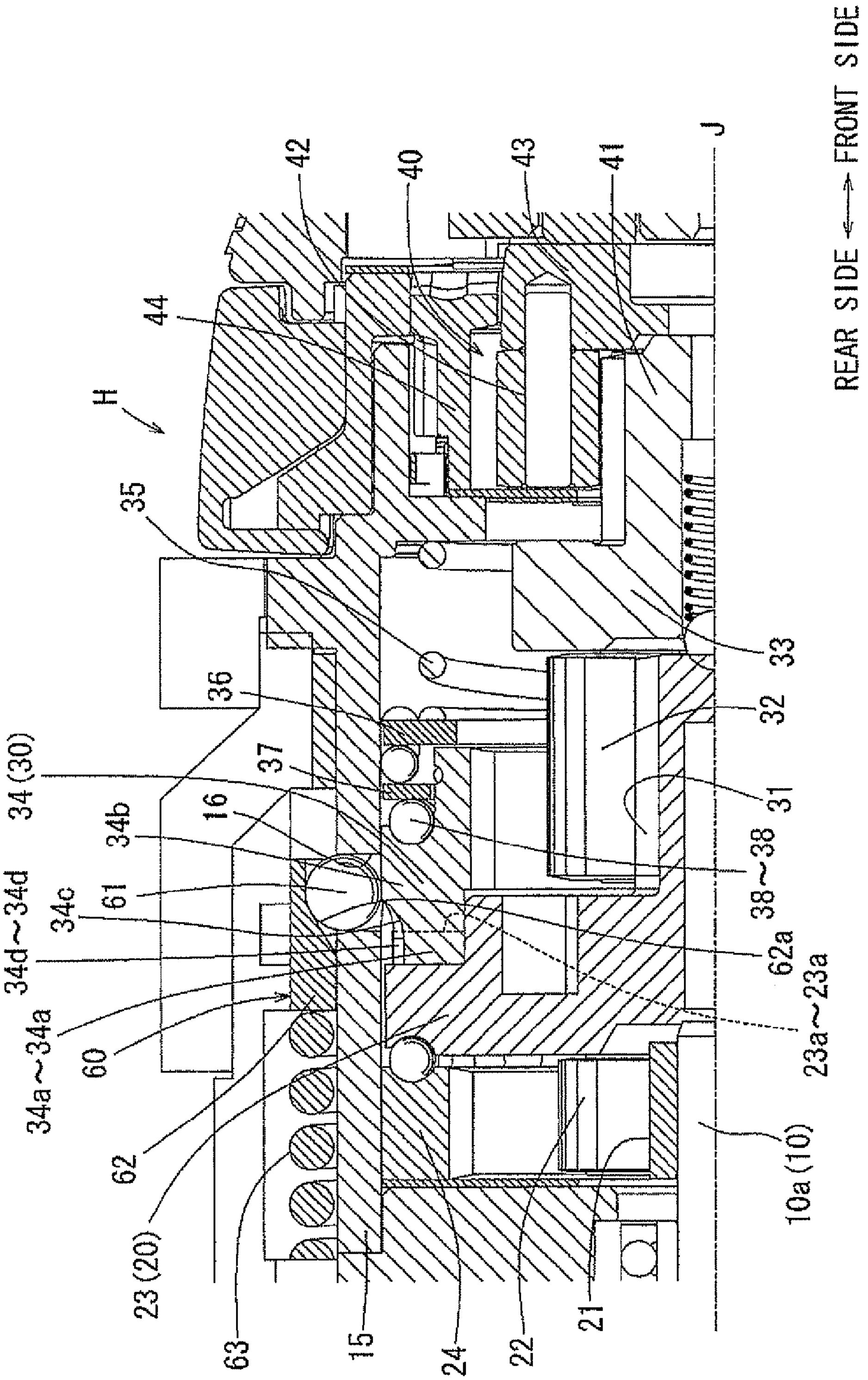
FIG. 4 is an enlarged view of a speed change lock mechanism. This figure shows an unlock state of the speed change lock mechanism, and an initial state of the speed changing device.

The state shown in FIGS. 1, 2, and 4 is a state in which an external torque at a certain value or higher is not applied to the spindle 11 or a no-load state, and in this state, the urging force of the compression spring 35 acts on the second stage internal gear 34 via the pressing plate 36, and consequently the second stage internal gear 34 is held at the rotation-allowed position and rotates together with the first stage carrier 23. This state corresponds to an initial state of the speed changing device H.

In a state in which the clutch teeth 34*a*-34*a* engage the clutch teeth 23*a*-23*a* of the first stage carrier 23 due to positioning of the second stage internal gear 34 at the rotation-allowed position on the rear side, the second stage internal gear 34 rotates together with the first stage carrier 23, and hence the reducing ratio of the second stage planetary gear mechanism 30 is reduced and, consequently, the spindle 11 rotates at a high-speed and a low-torque (high-speed low-torque output state). In contrast, in a state in which engagement between the clutch teeth 34*a*-34*a* and the clutch teeth 23*a*-23*a* of the first stage carrier 23 is released due to displacement of the second stage internal gear 34 to the rotation-restricted position on the front side as a result of application of an external torque to the spindle 11 reaching a certain value or higher, speed reduction by the second stage planet 30 is added to the speed reduction by the first stage planet and, consequently, the spindle 11 rotates at a low-speed and a high-torque (low-speed high-torque output state). The switching between the former high-speed low torque output state and the latter low-speed high-torque output state is automatically performed on the basis of the external torque applied to the spindle 11.

The low-speed high-torque output state switched once in conjunction with increase in the external torque applied to the spindle 11 is locked by a speed change lock mechanism 60 described below.

[Speed Change Lock Mechanism 60]

Next, the speed changing device H includes the speed change lock mechanism 60 configured to lock the second stage internal gear 34 at the rotation-restricted position and lock the speed changing device H to the low-speed high-torque output state.

The speed change lock mechanism 60 includes an annular-shaped lock ring 62 supported on the outer peripheral side of the gear housing 15. The lock ring 62 is supported so as to be movable in the direction of the tool axis J within a certain range. Interposed between a rear surface of the lock ring 62 and the side of the gear housing 15 is a compression spring 63. The lock ring 62 is urged by the compression spring 63 toward a lock position on the front side.

Figure 5:
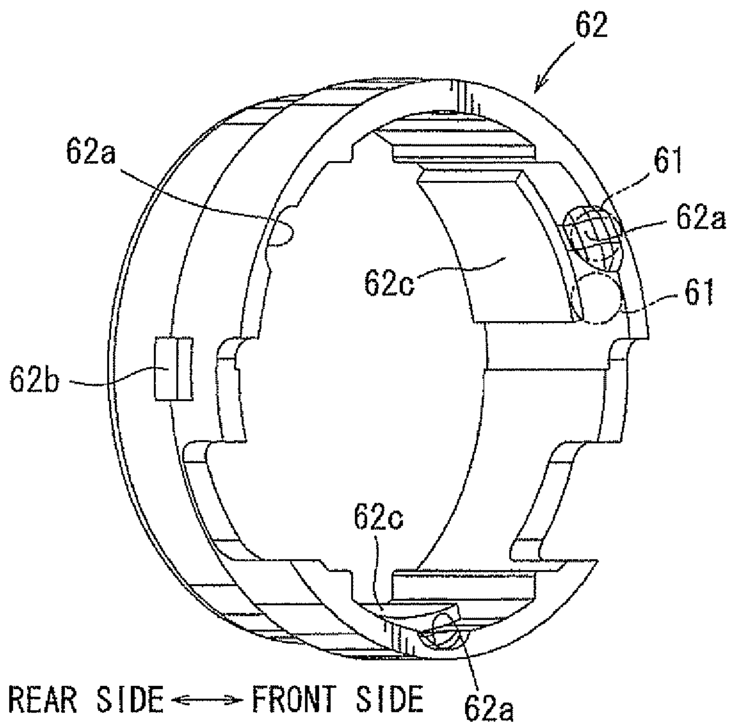
FIG. 5 is a perspective view of a lock ring shown separately.

FIG. 5 shows the lock ring 62 separately. Provided on an inner peripheral surface of the lock ring 62 are three relief recesses **62*a*-62*a*. These three relief recesses 62*a*-62*a*** are arranged at three positions in the circumferential direction, which divide the circumference into three equal parts, about the tool axis J.

Figure 6:
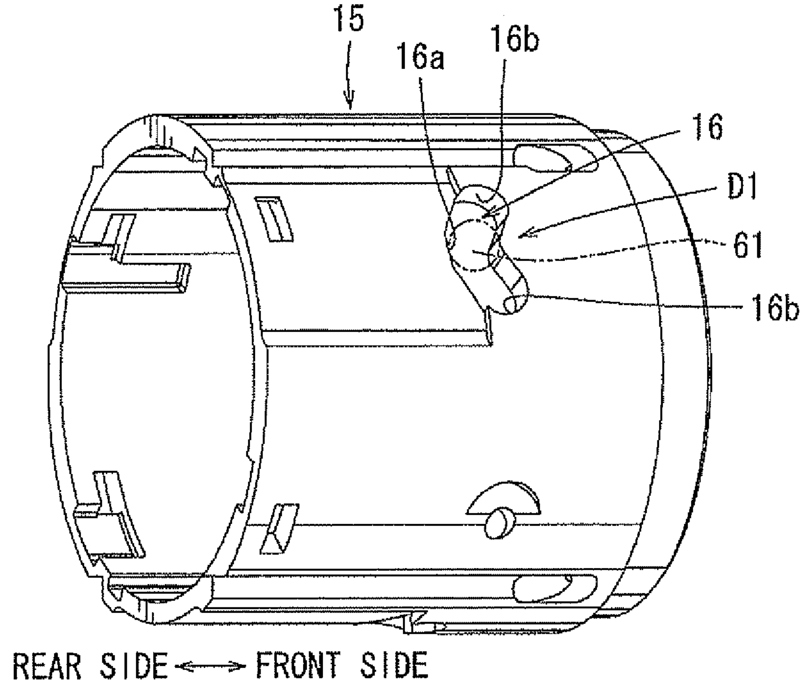
FIG. 6 is a perspective view of a gear housing shown separately.

FIG. 6 shows the gear housing 15 separately. V-shaped holding holes 16-16 are provided at three positions around the gear housing 15, which divide the circumference of the gear housing 15 into three equal parts. These three V-shaped holding holes 16-16 are each arranged in an orientation in which both end portions 16, 16 are on the front side and a center portion **16*a* on the rear side. An engaging ball 61 is held in each of these three holding holes 16-16 so as to be displaceable between a position projecting into the gear housing 15** and a position not projecting therein.

In FIG. 7 to FIG. 12, positional relationships between the second stage internal gear 34, the engaging balls 61 and the lock ring 62 in stages where the speed changing device H is switched between the high-speed low-torque output state and the low-speed high-torque output state (the operating state of the speed change lock mechanism 60) are shown.

Figure 7:
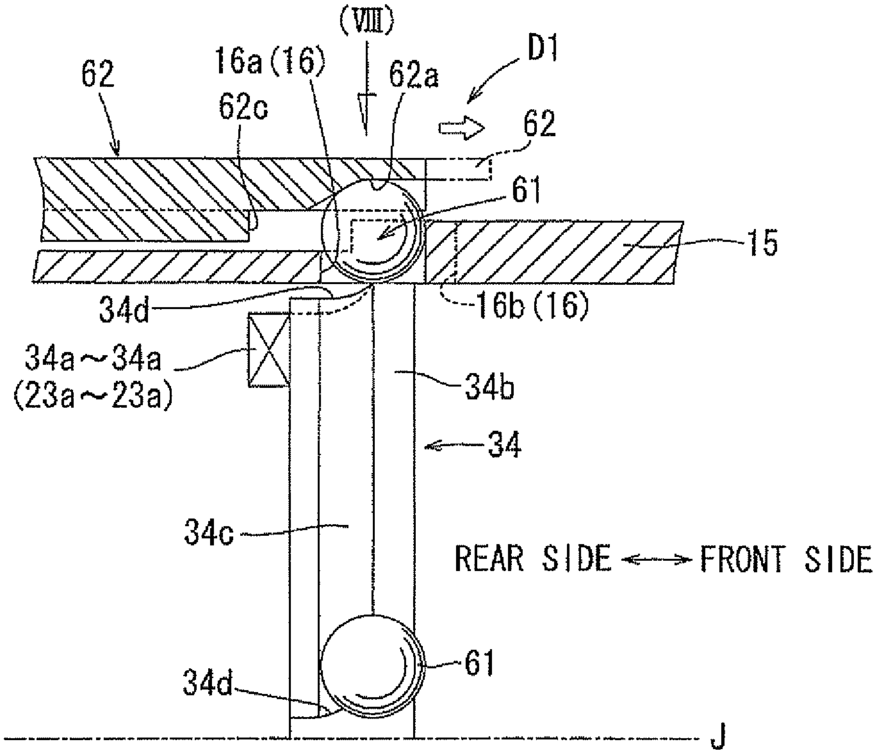
FIG. 7 is an enlarged view of the speed change lock mechanism and a first delay mechanism partly in a vertical cross section. This figure shows an initial state of the speed changing device and a state where the lock ring is positioned at an unlock position. In addition, this figure shows the front portion of the lock ring moved to the lock position by a double-dashed chain line.
Figure 8:
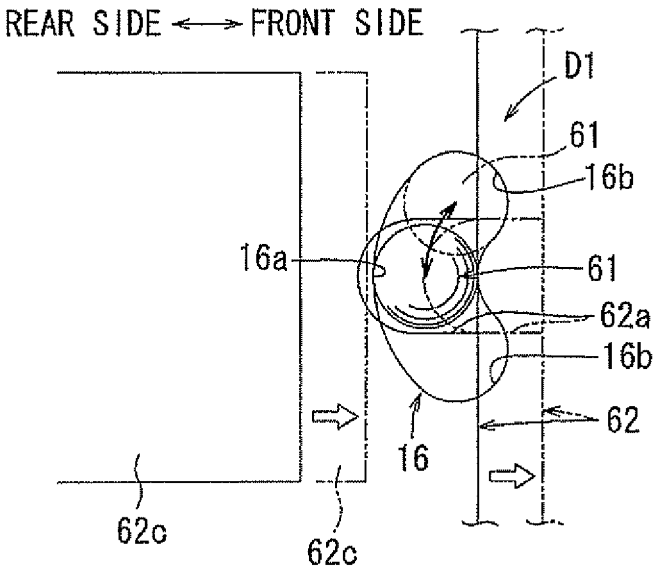
FIG. 8 is a view as viewed in the direction (VIII) in FIG. 7 and showing in a developed form a positional relationship between an engaging ball, a holding hole and a lock ring in a first delay mechanism. This figure shows an unlock position by a solid line and a lock position by a double-dashed chain line regarding the position of the lock ring. In addition, this figure shows a state in which the engaging ball is positioned at the center of the holding hole.

FIG. 7 shows an initial state of the speed changing device H (the same as the states shown in FIG. 2 and FIG. 4). In the initial state, the second stage internal gear 34 is positioned at the rotation-allowed position on the rear side by the urging force of the compression spring 35. Therefore, the lock ring 62 is positioned at an unlock position on the rear side against the compression spring 63, and the engaging balls 61 are refracted into the respective relief recesses **62*a* in a state of being held at positions not projecting into the gear housing 15. Consequently, the lock ring 62 is in a state of being held at an unlock position on the rear side. Since the engaging balls 61 enter the interior of the respective relief recesses 62*a* and the lock ring 62 is held in the unlock position on the rear side, the engaging balls 61 are held at the center portions 16*a* of the holding holes 16 as shown in FIG. 8**.

Figure 9:
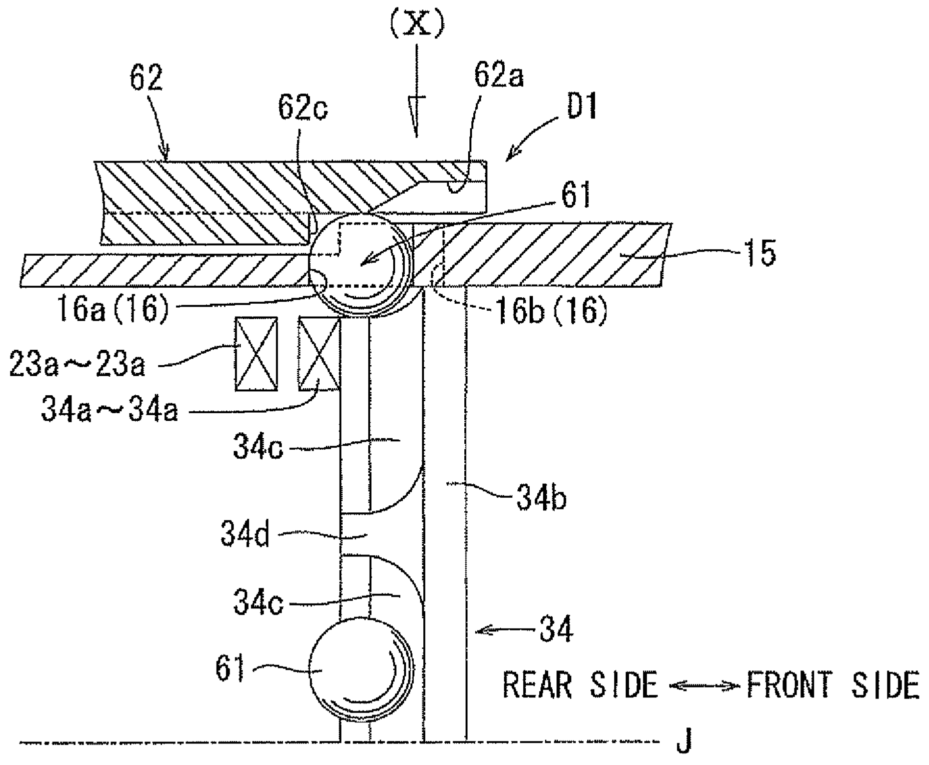
FIG. 9 is an enlarged view of the speed change lock mechanism and the first delay mechanism partly in a vertical cross section. This figure shows a low-speed high-torque output state of the speed changing device, which is a state in which the internal gear of the second stage planetary gear mechanism is displaced to the rotation-restricted position. In addition, this figure shows a state in which the engaging balls are fitted into engaging grooves of the internal gear and the lock ring is displaced to the lock position.
Figure 10:
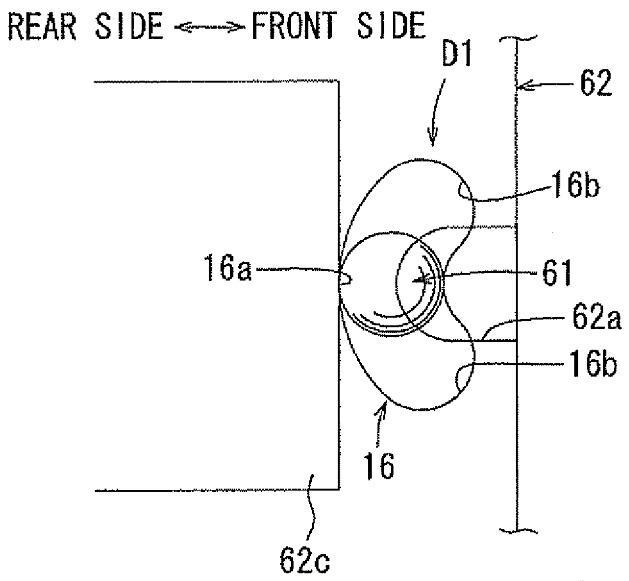
FIG. 10 is a view as viewed in the direction (X) in FIG. 9 and showing in a developed form a positional relationship between the engaging ball, the holding hole and the lock ring in the first delay mechanism when the speed changing device is in the low-speed high-torque output state. This figure shows a state in which the engaging ball is positioned at the center of the holding hole.

FIG. 9 and FIG. 10 show a state in which an external torque of the spindle 11 is increased and the second stage internal gear 34 is displaced to the rotation-restricted position on the front side against the compression spring 35. When the second stage internal gear 34 is displaced forward by a distance required for causing the clutch teeth **34*a*-34*a* to be disengaged from the clutch teeth 23*a*-23*a* of the first stage carrier 23, the flange portion 34*b* moves forwardly away from below the holding holes 16, and engaging groove portions 34*c* come below the holding holes 16, so that the respective engaging balls 61 are brought into a state of projecting toward the inner peripheral side of the gear housing 15 and entering into the engaging groove portions 34. As the engaging balls 61 are fitted into the engaging groove portions 34*c*, a projecting dimension toward the outer peripheral side of the gear housing 15 is reduced, so that the lock ring 62 is displaced forwardly by the urging force of the compression spring 63**.

Entry of the engaging balls 61 into the engaging groove portions **34*e* is ensured by being pressed by end portions (inclined surfaces) of the relief recesses 62*a* of the lock ring 62. As the engaging balls 61 are pressed into the engaging groove portions 34*c* by an indirect action of the compression spring 63, the second stage internal gear 34** is further displaced forwardly by a small distance (for example, 3 mm).

When the lock ring 62 is displaced to a lock position on the front side by the compression spring 63 while pressing the engaging balls 61 into the engaging groove portions **34*c*, each of the relief recesses 62*a* moves forwardly away from the engaging ball 61 as shown in FIG. 10, so that each of the engaging balls 61 is fixed to a state in which the engaging balls 61 are entered into the engaging groove portion 34*c*. With the engaging balls 61 fixed into the engaging groove portions 34*c*, the second stage internal gear 34 is locked at a position disconnected from the first stage carrier 23**.

After having disconnected from the first stage carrier 23, a rotational torque is applied to the second stage internal gear 34 through engagement of the second stage planetary gears 32-32, With this rotational torque, the second internal gear 34 rotates by a small angle instantaneously after having disconnected from the first stage carrier 23. In contrast, the engaging groove portions **34*c* are provided corresponding to the engaging balls 61 at three positions, which divide the circumference into three equal parts in the circumferential direction of the second stage internal gear 34. Therefore, by the rotation of the second stage internal gear 34 only by a small angle, three engaging balls 61-61 engage the engaging wall portions 34*d* at ends of the respective engaging groove portions 34*c* in the circumferential direction, and as the second internal gear 34 is rotated by a certain angle in this engaged state, each of the engaging balls 61 is displaced in a direction intersecting the direction of displacement (the direction of tool axis J) of the lock ring 62, that is, to one end portion 16*b* of each of the holding hole 16. In this manner, when the engaging balls 61 are clamped between the end portions (the engaging wall portions 34*d*) of the engaging groove portions 34*c* of the second stage internal gear 34 and the end portions 16*b* of the holding holes 16, the second internal gear 34** is brought into a state of being restricted from rotating.

[First Delay Mechanism D1]

The speed change lock mechanism 60 includes a first delay mechanism D1 for shifting the timing of releasing the lock state by the lock ring 62 by a given amount of time relative to the OFF operation of the switch lever 4.

Figure 11:
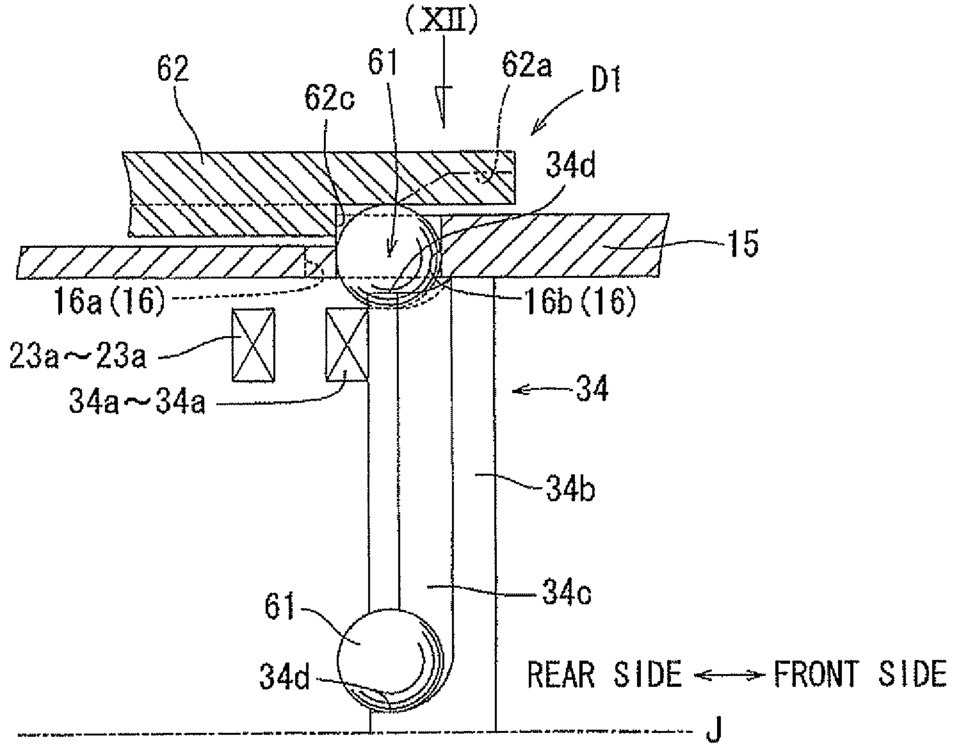
FIG. 11 is an enlarged view of the speed change lock mechanism and the first delay mechanism partly in vertical cross section. This figure shows a low-speed high-torque output state of the speed changing device, which is a state in which the internal gear of the second stage planetary gear mechanism is displaced to the rotation-restricted position. In addition, this figure shows a state in which the lock ring is displaced further forward by a distance corresponding to the displacement of the engaging balls to end portions of the holding holes in the direction of the tool axis.

As described above, since the holding holes 16 are each formed into a V-shape opening toward the front side, the second stage internal gear 34 is displaced further by a small distance (for example, 1.5 mm) toward the front side as the engaging balls 61 are displaced to the end portions **16*b* of the holding holes 16 by the rotational torque (rotating action) of the second stage internal gear 34. This state is shown in FIG. 11 and FIG. 12**.

Figure 12:
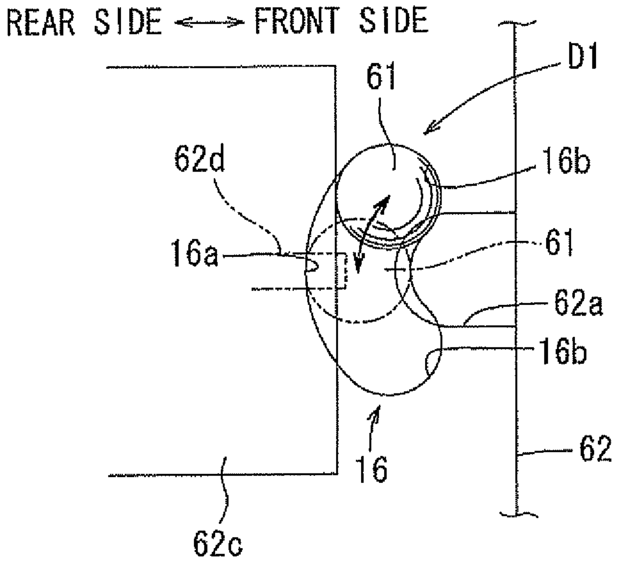
FIG. 12 is a view as viewed in the direction (XII) in FIG. 11 and showing in developed from a positional relationship between the engaging ball, the holding hole and the lock ring in the first delay mechanism when the speed changing device is in the low-speed high-torque output state. This figure is different from FIG. 10 in that the engaging ball has been displaced to the end portion of the holding hole, and in that the lock ring is displaced further forward and hence the center portion of the holding hole is covered by an engaging wall portion as a consequence.

As shown in FIG. 12, as the engaging balls 61 displace to the end portions **16*b* of the holding holes 16 due to the rotational torque applied to the second stage internal gear 34, the engaging balls 61 are brought into a state of being displaced in the circumferential direction (upward in FIG. 12) relative to the relief recesses 62*a*. Therefore, during the application of the rotational torque to the second stage internal gear 34 via the second stage planetary gears 32**, the engaging balls

61 are held in the end portions 16*b* of the holding holes 16 and hence cannot be retracted into the relief recesses 62*a*, thereby being reliably locked at a position in which the engaging balls 61 are entered in the engaging groove portions 34*c*. In this manner, the engaging balls 61 engage the engaging wall portions 34*d* of the engaging groove portions 34*c* and are held in the end portions 16*b* of the holding holes 16, so that the second internal gear 34 is locked at the rotation-restricted position on the front side in the direction of the tool axis J and hence the speed changing device H is brought into a state of being locked to the low-speed high-torque output state.

Further, provided on the inner peripheral surface of the lock ring 62 are engaging wall portions 62*c* corresponding to the respective relief recesses 62*a*. As shown in FIG. 12, as each of the engaging balls 61 projects toward the inner periphery of the gear housing 15 and the lock ring 62 is displaced to a lock position by an urging force of the compression spring 63, the engaging wall portion 62*c* is displaced forwardly together therewith so as to be brought into a state of covering the center portion 16*a* of the holding hole 16. Therefore, each of the engaging balls 61 cannot be displaced to the center portion 16*a* of the holding hole 16 due to the engaging wall portion 62*c*, and hence is locked to a state held at the end portion 16*b*. In this configuration, even in the event that an external torque applied to the spindle 11 is lowered or is brought to a no-load state in the low-speed high-torque output state, the engaging balls 61 are held at the end portions 16*b* of the holding holes 16 so as to be held in a state of being not forwardly displaceable and cannot be returned into the relief recess 62*a* unless the lock ring 62 is retracted to the unlock position against the compression spring 63 (unless the speed change lock mechanism 60 is released) and, consequently, the engaging balls 61 are held in a state of projecting toward the inner peripheral side of the gear housing 15 and being fitted into the engaging groove portions 34*c*. Therefore, even in the event that the external torque of the spindle 11 is lowered or the like, the second stage internal gear 34 is still held at the rotation-restricted position, and the speed changing device H is held in the low-speed high-torque output state.

The lock state of the speed change lock mechanism 60 is released as the engaging balls 61 retract into the relief recesses 62*a* after the engaging balls 61 have returned from the end portions 16*b* to the center portions 16*a* of the holding holes 16, and therefore, resetting of the speed changing device H to its initial state is delayed by an amount of time required for the engaging balls 61 to return from the end portions 16*b* to the center portions 16*a* of the holding holes 16. Accordingly, a configuration in which the holding holes 16 for holding the respective engaging balls 61 are formed into a V-shape to cause the engaging balls 61, which are in a state of engaging the respective engaging groove portions 34*c* of the second stage internal gear 34, to be displaced in the direction intersecting the direction of displacement of the lock ring 62 (the direction of the tool axis 3), that is, from the center portion 16*a* to the end portion 16*b* of the respective holding holes 16 corresponds to the first delay mechanism D1.

[Reset Mechanism 90]

The lock state of the speed change lock mechanism 60 is released as the lock ring 62 is returned back to the unlocked side (initial position) by a reset mechanism 90 described below, and the speed changing device H is therefore returned to the initial state. The reset mechanism 90 is shown in detail in FIG. 13 and its subsequent figures. The reset mechanism 90 is operated by the OFF operation of the switch lever 4. The reset mechanism 90 is provided with a reset arm 91.

Figure 15:
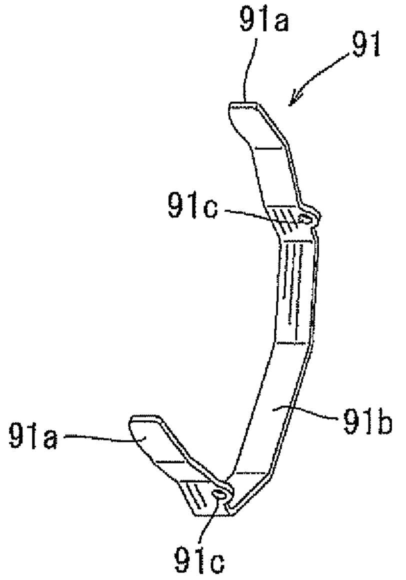
FIG. 15 is a perspective view of a reset arm shown separately.
Figure 16:
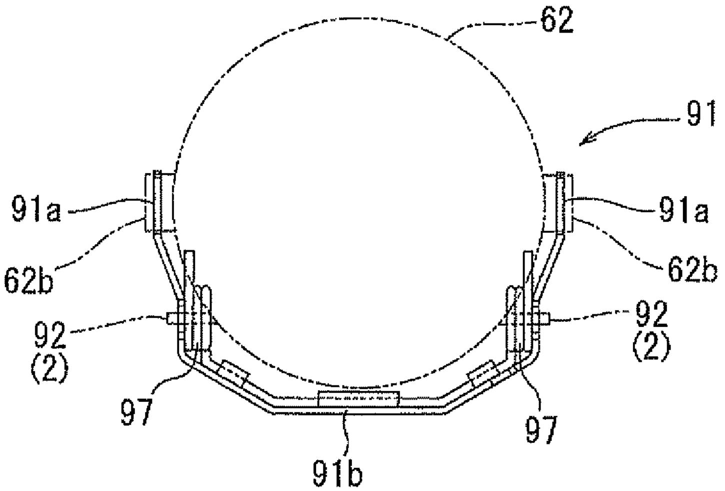
FIG. 16 shows the reset arm as viewed from the front side.

The reset arm 91 is shown in FIG. 15 and FIG. 16. As shown in the drawings, the reset arm 91 has a shape curved into a substantially semi-arcuate shape, and is supported along the lower side of the main body portion 2 over substantially half the circumference thereof. The reset arm 91 includes a pair of left and right operating portions 91*a*, 91*a* at both end portions, an engaging portion 91*b* at the center of the arc, and a pair of left and right supporting holes 91*c*, 91*c*. Supporting shafts 92, 92 provided coaxially with each other at the left and right side portions of the main body portion 2 are inserted into the supporting holes 91*c*, 91*c* respectively, so that the reset arm 91 is supported via the both supporting shafts 92, 92 so as to be tillable in the forward and rearward direction.

The reset arm 91 is urged in a resetting direction by torsion springs 97, 97, which cause the operating portions 91*a*, 91*a* to be displaced rearward. One end of each of the both torsion springs 97, 97 engages the gear housing 15 side, and the other ends thereof are connected to each other and engage the reset arm 91 side. As the reset arm 91 is tilted toward the resetting side by the urging forces of the torsion springs 97, 97, the lock ring 62 is returned to the unlock position, so that the speed changing device H is reset to the initial state.

Figure 13:
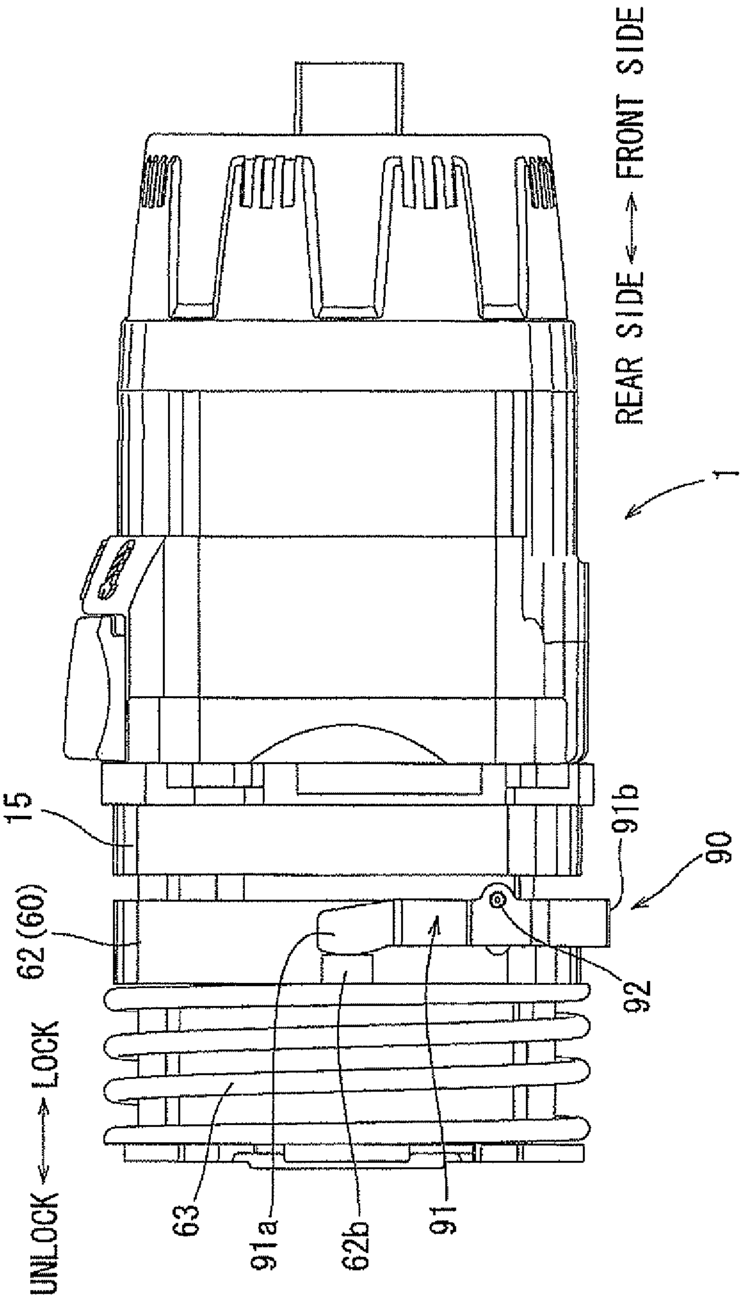
FIG. 13 is a side view of a reset mechanism in the speed change lock mechanism. This figure shows a state in which the lock ring is positioned at a lock position on the front side.
Figure 14:
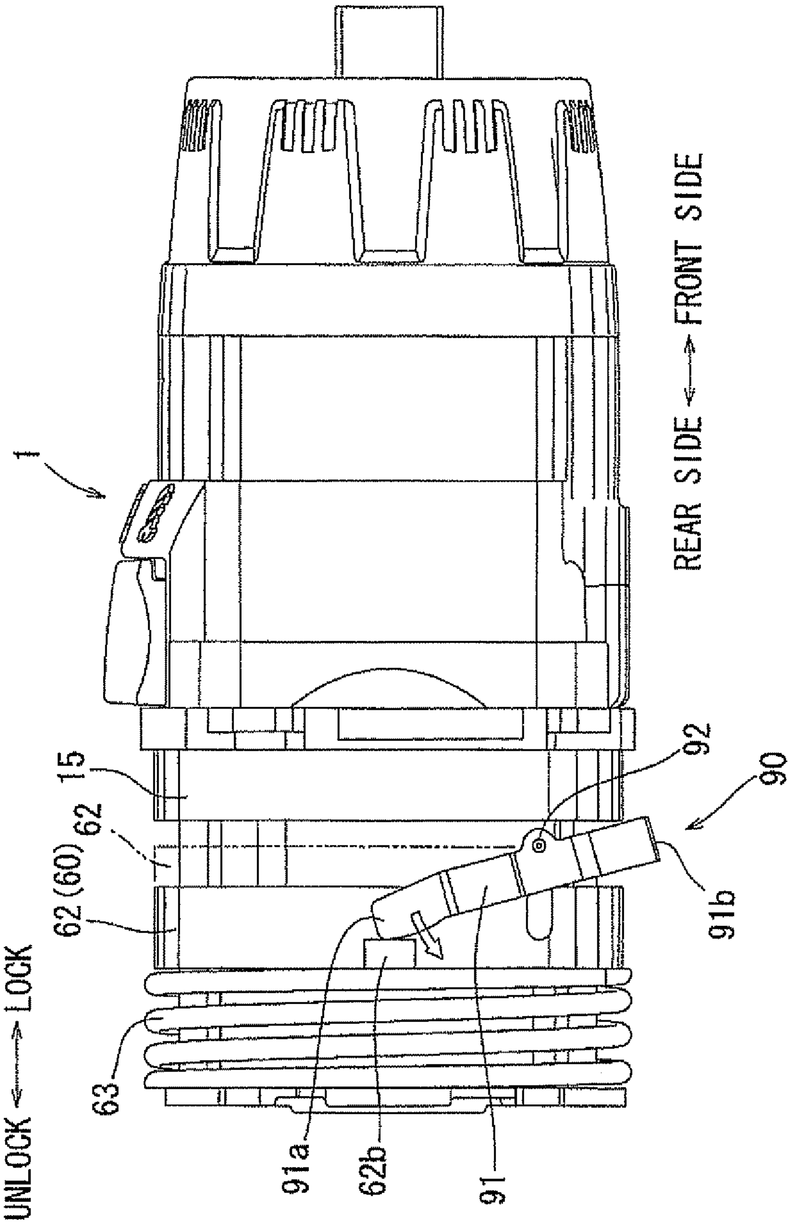
FIG. 14 is a side view of the reset mechanism in the speed change lock mechanism. This figure shows a state in which the lock ring has been returned to an unlock position on the rear side.

As shown in FIG. 13 and FIG. 14, the engaging portion 91*b* of the reset arm 91 is located on the side of the lower surface of the main body portion 2. The reset arm 91 is tilted in the forward and rearward direction as the engaging portion 91*b* is displaced in the forward and rearward direction.

On the other hand, engaging projections 62*b*, 62*b* are provided on both left and right side portions of the lock ring 62. The both left and right operating portions 91*a*, 91*a* of the reset arm 91 are brought into abutment with the front sides of the both engaging projections 62*b*, 62*b*. As described later, the reset arm 91 is tilted counterclockwise (the resetting direction, the direction indicated by an outline arrow in FIG. 14) about the supporting shafts 92, 92 as the engaging portion 91*b* displaces forwardly by the OFF operation of the switch lever 4. As the reset arm 91 is tilted in the resetting direction indicated by the outline arrow in FIG. 14, the engaging projections 62*b*, 62*b* are pushed rearward by the operating portions 91*a*, 91*a* respectively, so that the lock ring 62 is returned from the lock position on the front side indicated by a double-dashed chain line in FIG. 14 to the unlock position on the rear side indicated by a solid line.

The reset arm 91 is tilted in conjunction with the ON and OFF operations of the switch lever 4. The operating states of the reset aim 91 by the ON and OFF operations of the switch lever 4 are shown in FIG. 17 to FIG. 21. The switch lever 4 is integrally provided with an arm operating portion 4*a* and a latch operating portion 4*b*. A latch lever 93 is arranged in the vicinity of the base portion of the handle portion 3 (the lower portion of the main body portion 2) between the latch operating portion 4*b* of the switch lever 4 and the engaging portion 91*b* of the reset arm 91. The latch lever 93 is vertically tiltably supported at the lower portion of the main body portion 2 via a supporting shaft 94 connected at a substantially center in the longitudinal direction. The latch lever 93 is urged clockwise in the drawing (also referred to as "resetting direction") by a torsion spring 95. The torsion spring 95 urges the front side operating portion (an end portion on the front side with respect to the supporting shaft 94) 93*a* of the latch lever 93 in a direction of displacing obliquely downward and urges the rear side operating portion (an end portion on the rear side with respect to the supporting shaft 94) in a direction of displacing obliquely upward. The range of the clockwise tilting movement of the latch lever 93 is restricted by a stopper portion 96 provided on the lower portion of the main body portion 2.

Figure 17:
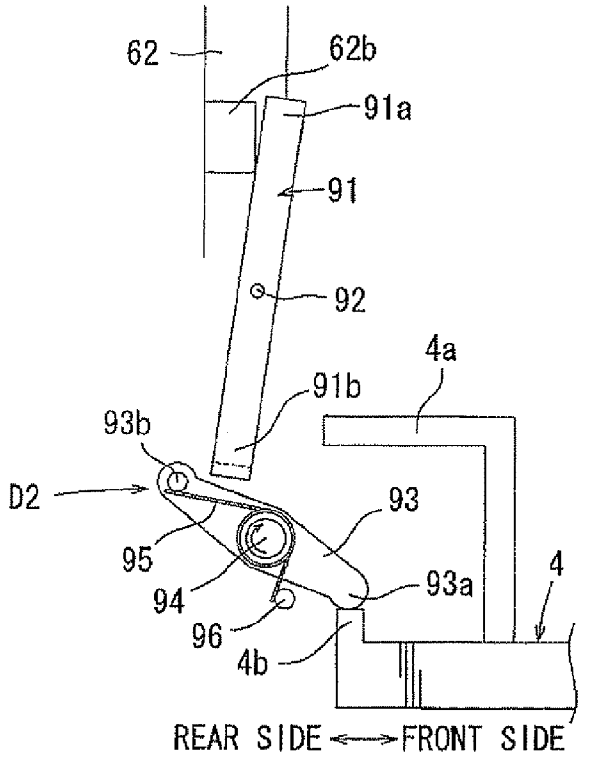
FIG. 17 is a side view of a second delay mechanism. This figure shows a state in which the switch lever is positioned at an initial position and hence the reset arm is returned to a reset position and the lock ring is held at the unlock position.

FIG. 17 shows an initial state in which the ON operation of the switch lever 4 is not performed. In this initial state, the switch lever 4 is positioned at the OFF position on the front side by an urging force of the spring. At this OFF position, the front side operating portion 93*a* of the latch lever 93 is in the state of being pushed upward by the latch operating portion 4*b* of the switch lever 4, and hence the rear side operating portion 93*b* of the latch lever 93 is in the state of being retracted obliquely downward. As the rear side operating portion 93*b* of the latch lever 93 retracts obliquely downward, rearward displacement of the engaging portion 91*b* of the reset arm 91 is allowed.

Figure 18:
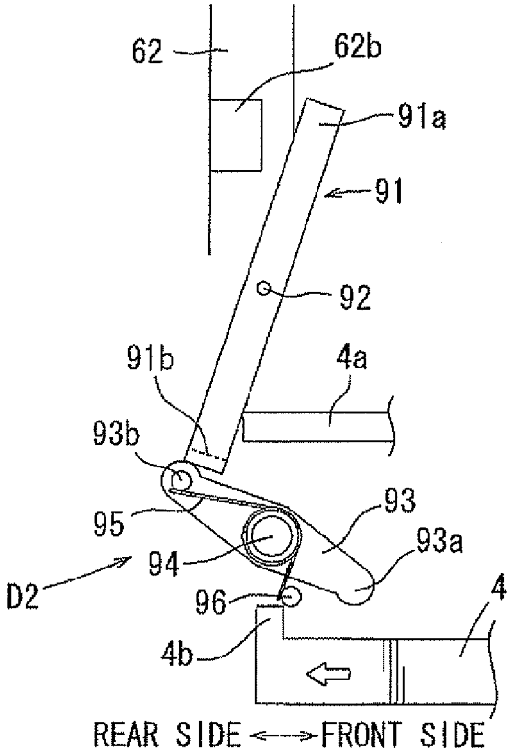
FIG. 18 is a side view of the second delay mechanism. This figure shows a halfway stage of an ON operation of the switch lever. This figure shows a stage at the beginning of the tilting movement of the reset arm to a non-reset position by being pushed by an arm operating portion of the switch lever. In addition, this figure shows the lock ring in a state of being positioned at the unlock position.
Figure 19:
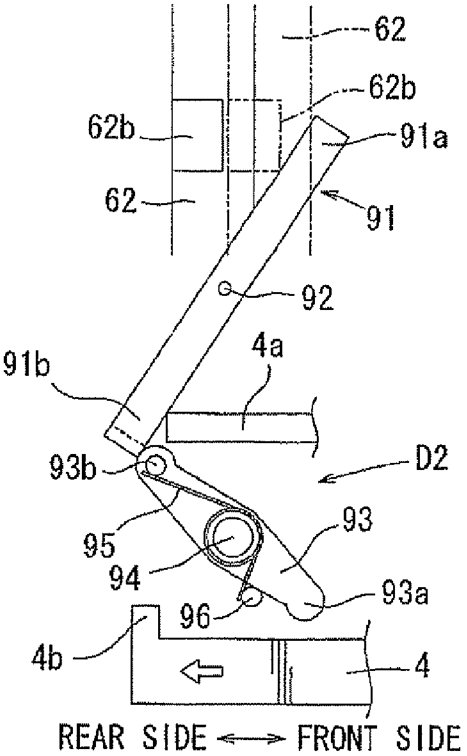
FIG. 19 is a side view of the second delay mechanism. This figure shows a state after the ON operation of the switch lever. The reset arm is shown in the state of being locked in the non-reset position. In this figure, the lock ring at the unlock position is indicated by a solid line, and the lock ring at the lock position is shown in a double-dashed chain line.

When a pulling operation (ON operation) of the switch lever 4 is performed from this initial state, the electric motor 10 is activated in the main body portion 2, and at the same time, the engaging portion 91 b of the reset arm 91 is pushed backward by the arm operating portion 4*a* of the switch lever 4 as shown in FIG. 18 and FIG. 19, so that the reset arm 91 is tilted in the direction of displacing the operating portions 91*a*, 91*a* forwardly (counter-resetting direction). As described above, the reset arm 91 is urged in the direction of displacing the operating portions 91*a*, 91*a* rearwardly (the resetting direction) by torsion springs 97, 97. Therefore, the ON operation of the switch lever 4 is performed while tilting the reset arm 91 in the counter-resetting direction (clockwise direction in the drawing) against the torsion springs 97, 97.

In addition, as the ON operation of the switch lever 4 is performed and the tilting movement of the reset arm 91 occurs in the counter-resetting direction via the process shown in FIG. 17→FIG. 18→FIG. 19, the engaging portion 91*b* is displaced rearward relative to the rear side operating portion 93*b* of the latch lever 93. On the other hand, as a result of the ON operation of the switch lever 4 and the movement of the latch operating portion 4*b* thereof rearward away from the front operating portion 93*a* of the latch lever 93, the latch lever 93 is tilted clockwise by the urging force of the torsion spring 95 as shown in FIG. 19. Accordingly, the latch lever 93 is held in a state of being in abutment with the stopper portion 96 (the state shown in FIG. 19) during the operation of the main body portion 2 achieved by the ON operation of the switch lever 4. In this state, since the reset arm 91 is in a state in which the operating portions 91*a*, 91*a* thereof are displaced forward as shown in the drawing, the lock ring 62 is in a state of being displaceable toward the lock position on the front side and displaceable to a position where the low-speed high-torque output state of the speed changing device H is locked. The reset arm 91 is pushed by the arm operating portion 4*a* of the switch lever 4 and, additionally, the rear side operating portion 93*b* of the latch lever 93 is positioned on the front side of the engaging portion 91*b*, and therefore, the reset arm 91 is locked in a state of being tilted to the counter-resetting direction (the position shown in FIG. 19).

[Second Delay Mechanism D2]

During the operation of the main body portion 2 shown in FIG. 19, the speed changing device H may change the speed from the high-speed low-torque output state to the low-speed high-torque output state, and this state is locked by the displacement of the lock ring 62 of the speed change lock mechanism 60 to the lock position on the front side as indicated by a double-dashed chain line in FIG. 19. This speed-change lock state is held even when the load torque of the spindle 11 has shifted to a lowered state (for example, no-load state), This speed-change lock state is reset by the reset mechanism 90 that is operated by the OFF-operation of the switch lever 4. The operation of the reset mechanism 90 performed by the OFF operation of the switch lever 4 is shown in FIG. 20 and FIG. 21.

When the switch lever 4 is displaced forwardly by the OFF operation in a state in which the speed changing device H is locked in the low-speed high-torque output state, the arm operating portion 4*a* is displaced forwardly away from the engaging portion 91*b* of the reset arm 91. However, in this stage, since the rear side operating portion 93*b* of the latch lever 93 is still positioned on the front side of the engaging portion 91*b*, the reset arm 91 is held in the counter-resetting direction and hence the lock ring 62 is positioned at the lock position on the front side as indicated by a solid line in the drawing. Accordingly, at the beginning of the OFF operation of the switch lever 4, the switch lever 4 moves idle relative to the reset arm 91 by a given distance, whereby the resetting operation is delayed by the corresponding amount of time. The configuration as described above constitutes the second delay mechanism D2.

Figure 21:
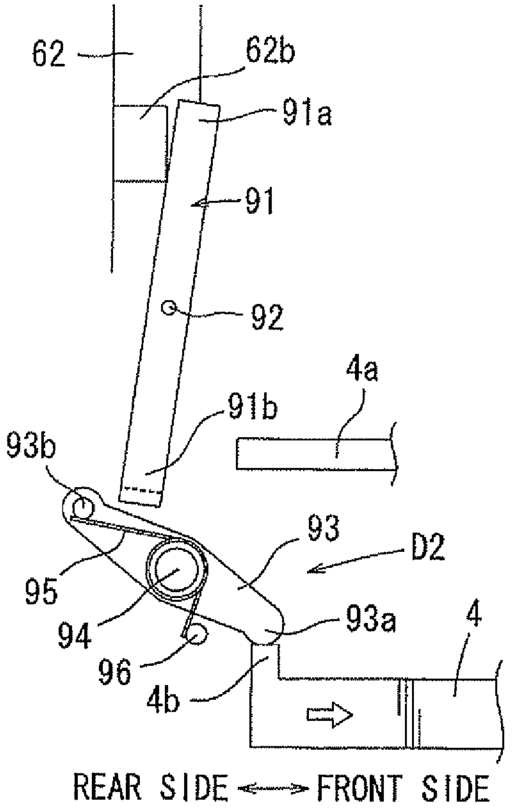
FIG. 21 is a side view of the second delay mechanism. This figure shows the same state as that shown in FIG. 17, in which the switch lever is returned to the initial position and hence the latch lever is released and the reset arm is returned to the reset position and, consequently, the lock ring is returned to the unlock position.

When the switch lever 4 is further moved forwardly by the OFF operation and is returned back to the initial position as shown in FIG. 21, the latch operating portion 4*b* moves to a position on the lower side of the front side operating portion 93*a* of the latch lever 93, and hence the front side operating portion 93*a* is pushed upward, so that the latch lever 93 is tilted counterclockwise in the drawing against the torsion spring 95.

Figure 20:
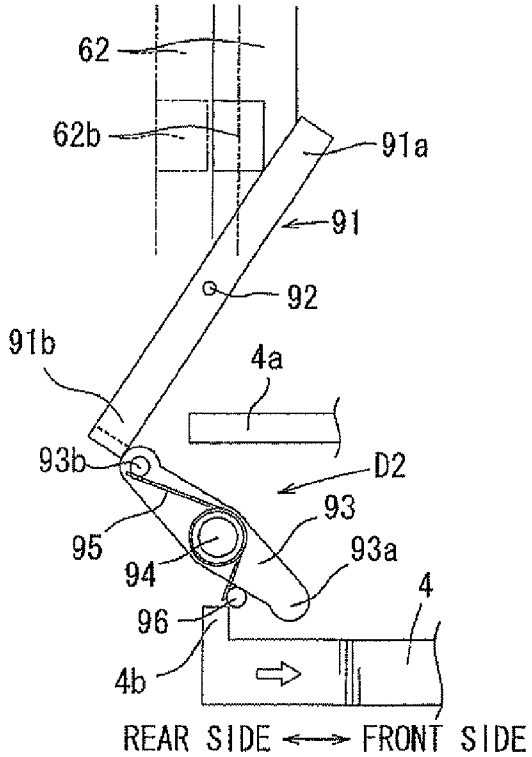
FIG. 20 is a side view of the second delay mechanism. This figure shows a halfway stage of an OFF operation of the switch lever. This figure shows that the reset arm is still locked in the non-reset position by the latch lever, and hence is in an idling state relative to the switch lever reset arm. This figure shows the lock ring at the lock position by a solid line and the lock ring at the unlock position by a double-dashed chain line.

When the latch lever 93 is tilted counterclockwise in the drawing according to the process shown from FIG. 20 to FIG. 21, the rear side operating portion 93*b* thereof is retracted obliquely downward and moves away from the engaging portion 91*b* of the reset arm 91. Therefore, the engaging portion 91*b* is brought to be forwardly displaceable, and hence the reset arm 91 is tilted in the resetting direction (the counterclockwise direction in the drawing) by the urging forces of the torsion springs 97, 97. As the reset arm 91 is tilted in the resetting direction by the torsion springs 97, 97, the engaging projections 62*b*, 62*b* are pushed rearward by the operating portions 91*a*, 91*a*, so that the lock ring 62 is displaced to the unlocked side.

In this manner, if the OFF operation of the switch lever 4 is performed in a state in which the external torque of the spindle 11 is lowered, or in a no-load state in which the external torque is removed, the reset mechanism 90 is activated after a given period of time by the second delay mechanism D2, and the lock ring 62 is returned to the unlock position. When the lock ring 62 is returned to the unlock position against the compression spring 63, the speed changing device H is reset to the initial state, that is, to the high-speed low-toque output state.

Figure 22:
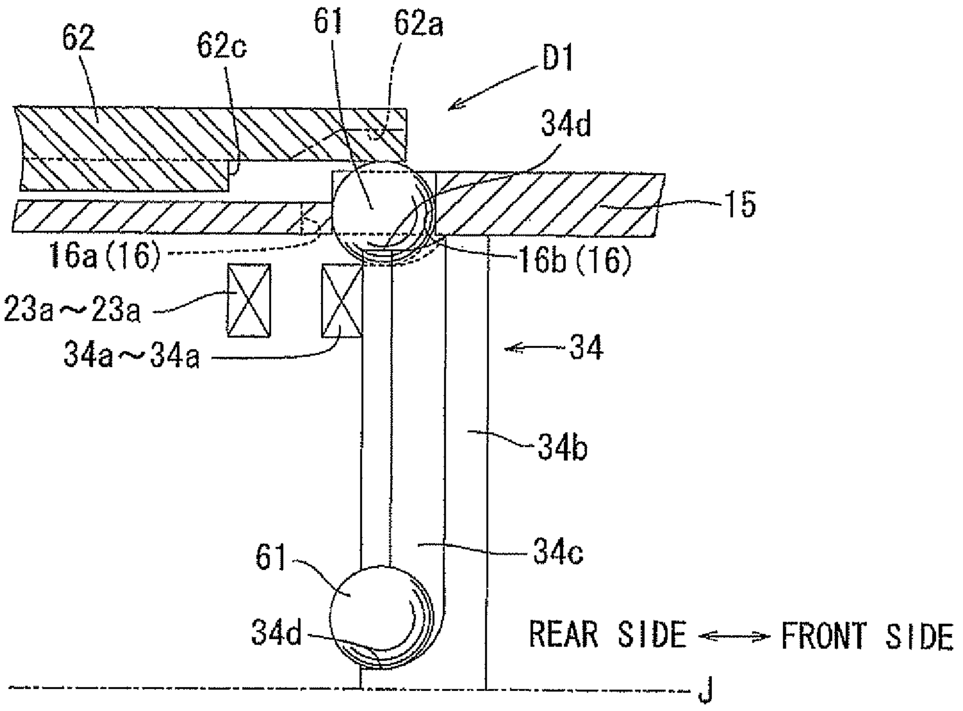
FIG. 22 is an enlarged view of the speed change lock mechanism and the first delay mechanism partly in a vertical cross section. This figure shows a low-speed high-torque output state of the speed changing device, which is a state in which the internal gear of the second stage planetary gear mechanism is locked to the rotation-restricted position. This figure shows that even though the lock ring is returned to the unlock position by the reset mechanism, the engaging balls cannot be retracted into the relief recess because they are at end portions of the holding holes, whereby the internal gear is still in a state of being locked to the rotation-restricted position.

When the lock ring 62 is returned to the unlock position by the reset mechanism 90 as shown in FIG. 22, the engaging wall portions 62*c* are retracted together therewith, so that each of the engaging balls 61 is brought into a state of being displaceable to the center portion 16*a* of the holding hole 16. On the other hand, since the external torque of the spindle 11 is lowered or no load is applied, no large rotational torque is applied to the second stage internal gear 34 via the second stage planetary gears 32-32. Therefore, a state is resulted in which no external force for holding the engaging balls 61 at the end portions 16*b* of the holding holes 16 via the second stage internal gear 34. Accordingly, when the lock ring 62 and hence the engaging wall portions 62*c* are retracted, the second stage internal gear 34 starts to be retracted toward the rotation-allowed position by the urging force of the compression spring 35 and, in conjunction with this, the engaging balls 61 fitted into the engaging groove portions 34*c* are pushed to the center portions 16*a* of the holding holes 16.

Figure 23:
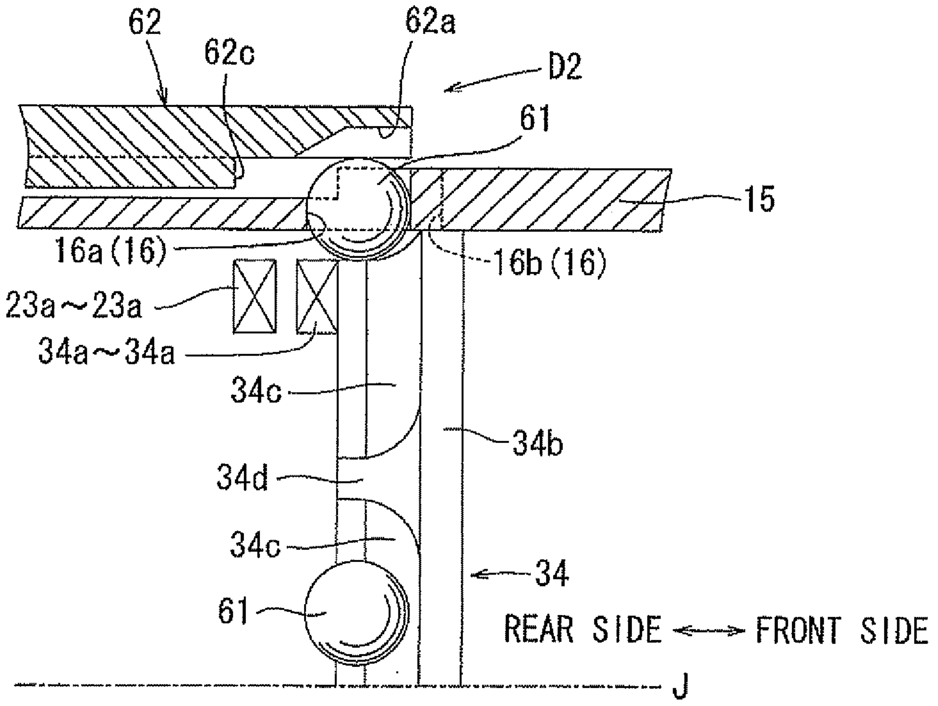
FIG. 23 is an enlarged view of the speed change lock mechanism and the first delay mechanism partly in a vertical cross section. This figure shows a momentary state immediately before a state in which the engaging balls are returned to the relief recesses from the engaging grooves of the internal gear as a consequence of that the lock ring is returned to the unlock position by the reset mechanism and the rotational torque of the second stage planetary gear mechanism applied to the internal gear is removed and, consequently, the engaging balls are returned to the center portions of the holding holes.

When the engaging balls 61 have been returned to the center portions 16*a* of the holding holes 16, as shown in FIG. 23, relief recesses 62*a* are positioned on their radially outer side (upper side in FIG. 23). Therefore, the engaging balls 61 are pushed out to positions (unlocked positions) not protruding on the side of the inner periphery of the gear housing 15 by the retracting operation of the second stage internal gear 34 and are returned into the relief recesses 62 as shown in FIG. 7. As the engaging balls 61 are returned into the relief recesses 62*a* and the holding holes 16 are closed by the flange portion 34*b* of the second stage internal gear 34, the engaging balls 61 are held within the relief recesses 62*a* and hence the lock ring 62 is locked to the unlock position on the rear side. Accordingly, the speed change lock mechanism 60 is released by the reset mechanism 90, and hence the second stage internal gear 34 is returned to the rotation-allowed position and the speed changing device H is reset to the initial state shown in FIGS. 2, 4, and 7.

According to the electric tool 1 having the speed changing device H configured as described above, in the speed change lock mechanism 60 configured to lock the low-speed high-torque output state of the speed change lock mechanism 60, the second stage internal gear 34 is locked so as not to move in the direction of the tool axis J at the rotation-restricted position as the engaging balls 61-61 move from within the relief recesses 62*a* of the lock ring 62 to be fitted into the engaging groove portions 34*c* of the second stage internal gear 34. In addition, the second stage internal gear 34 is locked so as not to rotate as the engaging balls 61 are displaced from the center portions 16*a* to the end portions 16*b* of the holding holes 16 in a state in which the engaging balls 61 are fitted into the engaging groove portions 34*c* of the second stage internal gear 34. The engaging balls 61 are configured so as to be capable of entering the relief recesses 62*a* only in a state of being positioned at the center portions 16*a* of the holding holes 16 and not to be capable of entering the relief recesses 62*a* in a state of being positioned at the end portions 16*b* of the holding holes 16.

According to the configuration as described above, in the stage in which the OFF operation of the switch lever 4 is performed to reset the speed changing device H by the reset mechanism 90, the engaging balls 61-61 need to be returned from the end portions 16*b* to the center portions 16*a* of the holding holes 16 during a period after the lock ring 62 is retracted to the unlock position until the second stage internal gear 34 is returned to the rotation-allowed position, so that the engagement between the clutch teeth 34*a*-34*a* of the second stage internal gear 34 and the clutch teeth 23*a* -23*a* of the first stage carrier 23 is delayed for the time period required for enabling this (20-30 msec).

Accordingly, the first delay mechanism D1 is configured by the construction in which the engaging balls 61-61 are displaced from the center portions 16*a* to the end portions 16*b* of the holding holes 16 by the rotational torque of the second stage internal gear 34 at the rotation-restricted position, the rotational torque is then eliminated, and thereafter the engaging balls 61-61 are returned from the end portions 16*b* to the center portions 16*a* of the holding holes 16 by the urging force of the compression spring 35 acting via the second stage internal gear 34.

With the first delay mechanism D1, after the OFF operation of the switch lever 4, the clutch teeth 34*a*-34*a* of the second stage internal gear 34 are engaged with the clutch teeth 23*a*-23*a* after rotation of the electric motor 10 and the first stage carrier 23 through inertia has been stopped or immediately before the rotation is stopped, and therefore, an impact produced at the time of engagement is significantly reduced, whereby durability of the clutch teeth 23*a*-23*a*, 34*a*-34*a*, and hence the speed changing device H can be improved.

In addition, according to the reset mechanism 90 exemplified above, the second delay mechanism D2 constituted mainly of the latch lever 93 is interposed between the switch lever 4 and the reset arm 91. With the second delay mechanism D2, when the OFF operation of the switch lever 4 is performed, the reset arm 91 is tilted in the resetting direction by the torsion springs 97, 97 after a elapse of the time period required for the latch lever 93 to tilt by a given angle against the torsion spring 95 (the idling time of the switch lever 4), whereby the lock ring 62 is returned to the unlock position. Therefore, since the time when the lock ring 62 is returned to the unlock position is delayed by an amount of time after the OFF operation of the switch lever 4 until the latch lever 93 tilts by the given angle, the clutch teeth 34*a*-34*a* of the second stage internal gear 34 are engaged with the clutch teeth 23*a*-23*a* of the first stage carrier 23 after the stop of the rotation of the electric motor 10 and the first stage carrier 23 through inertia or immediately before the rotation is stopped, so that the impact applied at the time of engagement is reduced further reliably, and hence the durability of the speed changing device H can be improved.

Furthermore, it is possible to provide the engaging wall portions 62*c* on the inner peripheral side of the lock ring 62 at positions corresponding to the respective relief recesses 62*a* to cover the center portions 16*a* of the holding holes 16 with the engaging wall portions 62*c* for restricting each of the engaging balls 61 from returning to the center portion 16*a*, whereby the lock state brought by the speed change lock mechanism 60 is prevented from being released accidentally (without through the reset mechanism 90). Therefore, even in the event that the external torque of the spindle 11 is lowered or is brought to a no-load state, the state in which the second stage internal gear 34 is locked to the rotation-restricted position is not released, and hence the speed changing device H is held in the low-speed high-torque output state. In this configuration, for the penetrating operation with the electric tool 1 used as a boring drill, or for the screw removing operation with the electric tool 1 used as a screw tightening machine, it is possible to prevent resetting of the speed changing device H to the initial state at the timing when the external torque applied to the spindle 11 is reduced or brought into a no-load state (when the load is released) as the operation is proceeded. In this case, the speed changing device H is reset by the OFF operation of the switch lever 4, and is also reset by the second delay mechanism D2 without producing a large impact.

Further, it is configured such that the engaging balls 61 are displaced in the direction intersecting the direction of displacement of the lock ring 62 (the direction of the tool axis 1), that is, toward the end portions 16*b* of the holding holes 16 to lock the second stage internal gear 34 to the rotation-restricted position and to thereby look the speed changing device H to the low-speed high-torque state. According to this configuration, even in the case that the stroke (amount of displacement) between the lock position and the unlock position of the lock ring 62 is set to be small, entry of the engaging balls 61 into the relief recesses 62*a* can be restricted to secure more reliable lock state, and therefore, the stroke of the lock ring 62 can be reduced and hence the reliable speed change lock state can be realized even in the case that the amount of puling operation of the switch lever 4 is not sufficient (when the force for pulling the trigger is not sufficiently strong).

Various modifications may be made to the embodiment described above. For example, although the configuration having the first and the second delay mechanisms D1, D2 has been exemplified, a configuration in which only one of the delay mechanisms is provided may be possible.

In addition, the first delay mechanism D1 was exemplified to have a configuration in which the holding holes 16 are formed into a V-shape, however, a simple long-groove hole shape elongated in the circumferential direction is also possible.

Further, although there has been exemplified a configuration in which returning of the engaging balls 61 to the center portions 16*a* is restricted by providing the engaging wall portions 62*c* extending in a given range in the circumferential direction on the inner peripheral side of the lock ring 62 and covering the center portions 16*a* of the holding holes 16 with the engaging wall portions 62*c*, it may be configured such that restricting projections 62*d* are integrally provided on the inner peripheral side of the lock ring 62, for example, as indicated by a double-dashed chain line in FIG. 12 instead of the engaging wall portions 62*c*. By bringing the restricting projections 62*d* into a state of protruding to the center portions 16*a* of the holding holes 16, returning of the engaging balls 61 to the center portions 16*a* can be restricted, so that similar effects and advantages to those of the exemplified engaging wall portions 62*c* can be obtained.

Although the explanation has been made to the case of rotating the spindle 11 in the normal direction, the invention is also applicable to the case where the electric tool 1 is used as a screw tightening machine and the rotation of the spindle 11 is reversed. In the case that the rotation of the spindle 11 is reversed, the direction of rotation of the second stage internal gear 34 is reversed, and therefore, the engaging balls 61 are displaced to the other end portions 16*b* (for example, the end portion 16*b* on the lower side in FIG. 8) of the holding holes 16 in the lock state in the low-speed high-torque output state by the speed change lock mechanism 60.

The invention claimed is:

1. An electric tool comprising:

an electric motor activated by an ON-operation of a switch lever;

a speed changing device configured to reduce a rotational power of the electric motor and output the same to a spindle;

wherein the speed changing device includes a first stage planetary gear mechanism on an upstream side of a power transmitting path and a second stage planetary gear mechanism on a downstream side thereof, the speed changing device being configured to be switched from an initial high-speed low-torque output state for outputting a high-speed low-torque to the spindle to a low-speed high-torque output state for outputting a low-speed high-torque to the spindle according to increase in an external torque applied to the spindle, wherein in the initial high-speed low-torque output state, an internal gear of the second stage planetary gear mechanism is positioned at a rotation-allowed position where the internal gear of the second stage planetary gear mechanism engages with a carrier of the first stage planetary gear mechanism;

wherein in the low-speed high torque output state, the internal gear of the second stage planetary gear mechanism is disengaged from the carrier of the first stage planetary gear mechanism and is displaced to a rotation-restricted position in which the rotation is restricted;

a speed change lock mechanism configured to lock the low-speed high-torque output state of the speed changing device;

a reset mechanism configured to release the speed change lock mechanism on the basis of an OFF-operation of the switch lever and reset the speed changing device to the initial high-speed low-torque state; and a delaying mechanism configured to shift in terms of time between timing of stopping the electric motor achieved by the OFF operation of the switch lever and timing of releasing the speed change lock mechanism achieved by the resetting mechanism.

2. The electric tool according to claim 1, wherein:

the speed change lock mechanism includes an engaging ball and a lock ring;

the engaging ball is held in a holding hole of a gear housing accommodating the second stage planet gear mechanism;

the engaging ball engages the internal gear and lock the internal gear to the rotation-restricted position when the internal gear is displaced to the rotation-restricted position;

the lock ring is configured to be displaced between a lock position in which the engaging ball is locked in engagement with the internal gear and an unlock position in which the engaging ball is accommodated in the relief recess and moved away from the internal gear: and the delay mechanism is configured to shift in terms of time between timing when the engaging ball in the state of being engaged with the internal gear is displaced in the direction intersecting the direction of displacement of the lock ring to displace the lock ring to the unlock position and timing when the engaging ball is accommodated in the relief recess to displace the internal gear to the rotation-allowed position.

3. The electric tool according to claim 1, wherein:

the speed change lock mechanism includes a lock ring configured to be displaced to the lock position locking the internal gear at the rotation-restricted position and to be displaced to the unlock position allowing displacement of the internal gear to the rotation-allowed position;

the resetting mechanism includes a reset arm displacing the lock ring to the unlocked position in conjunction with the OFF operation of the switch lever; and the delay mechanism includes a latch lever interposed between the switch lever and the reset arm, and is configured to set an idling distance for the displacement caused by the OFF operation of the switch lever with respect to the displacement of the lock ring to the unlock position via the latch lever, so that a shift in terms of time is caused between timing of stopping the electric motor achieved by the OFF operation of the switch lever and timing of release of the speed change lock mechanism achieved by the displacement of the lock ring to the unlock position.

* * * * *